X0009695
C. Higgins,
Cook Stove.
Patented June 2. 1836.
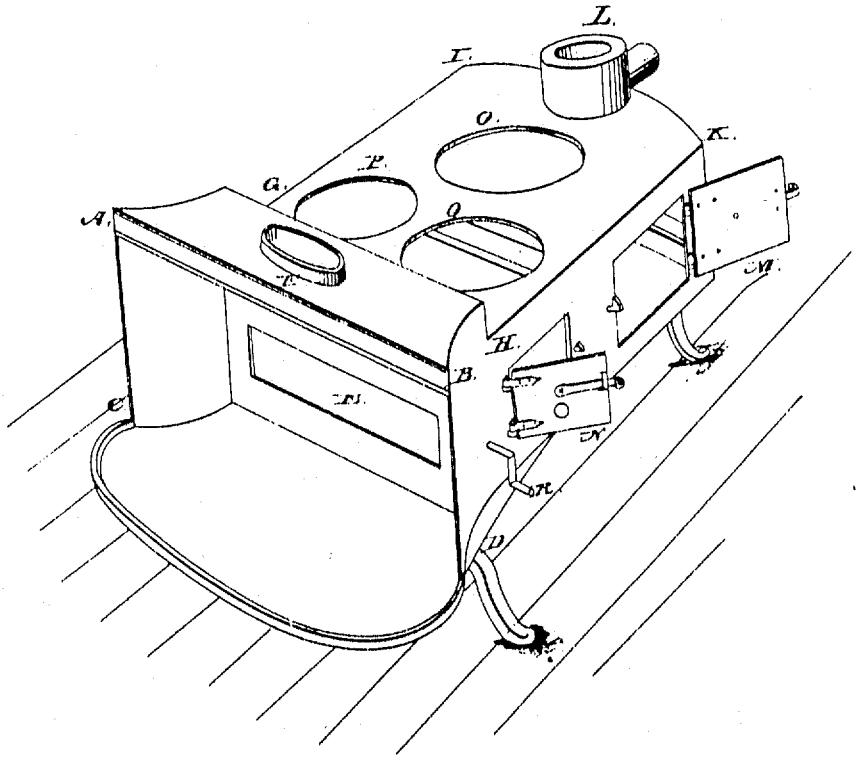
N. PETERS, PHOTO-LITHOGRAPHER, WASHINGTON, D. C.

9695X

June 2, 1836

Charles Higgins. Turner. Oxford Co. Maine

Letters Patent.

The Schedule referred to in these Letters Patent and making part of the same
containing a description in the words of the said Charles Higgins himself,
of his improvement in the Cooking Stove.

To all to whom these presents shall come. Be it known that
I the subscriber Charles Higgins of Turner in the County of Oxford and
State of Maine have invented a new and useful improvement in Stoves
used for domestic purposes commonly known and designated as Cooking
Stoves and that the following is a full and exact description thereof.
The front part consists of a Stove or fire place similar in form to the com-
mon open Stoves with the hearth and sides of cast iron and a straight
back at right angles with the hearth and nearly similar in form to the
common Franklin Stoves (represented in the annexed drawing at A B
C D.) In the top of this part is an opening for a funnel or pipe to carry
off the smoke when the other part is not in use (represented in the draw-
ing at F.) from ten to fourteen inches from the bottom of the Stove an
opening is made in the back from three to four inches wide (as shown at E)
which may be closed by a moveable damper turned by a crank or handle
on the outside (marked K.) The hearth extends back in one solid piece
of cast iron and supports the back and sides of the cooking part of the
Stove. In the top of this part there may be set three or four Boilers (as
at G.P.L.) and the fire and the heat coming through the opening in the
back will pass under the Boilers. The oven with a door on each side
(represented at M) is also constructed with plates of cast iron and
by means of a damper in the top that is between the top or upper plate
of the oven and the top of the Stove or part in which the boilers are set (as
represented at S.) the draught or heat may be made to pass under the
oven and up between the back of the Stove and sides of the oven and
then pass off in a funnel (at Q.) after passing over a part of the top of the oven. The funnel proceeding from the top plate of the Stove or piece in which the boilers are set. The sides of the Stove may each be made of one piece of cast iron and also the hearth.
The top in which the Boilers are set is also to be one piece. There is to be a door in the side (represented at N° ) opening into the [illegible] under the Boilers and when the front part is not used a fire may be kindled under the Boilers and the oven and Boilers heated
What I claim as my own and not previously known or used is that part of the Stove and the arrangement by which the heat is conveyed from the fire place under the boilers and to the cooking part of the Stove — I claim the construction of the Back with the moveable damper and the arrangement of the cooking part as connected with this back. the advantage of this improvement is that the stove may be used for the purposes of cooking, or it may be used as a common open Stove either or both and will answer equally well for the purposes of both — & I disclaim the rest.

Exd. Witnesses
WC William Harris
William Rogers

Charles Higgins

Drawing

675 [illegible]